United States Patent [19]

Barrera

[11] Patent Number: 4,541,170
[45] Date of Patent: Sep. 17, 1985

[54] METHOD AND DEVICE FOR FORMING THE ROTOR WINDING COILS OF A DYNAMOELECTRIC MACHINE

[75] Inventor: Giorgio Barrera, Leumann, Italy

[73] Assignee: Officine Meccaniche Pavesi & C. S.p.A., Cascine Vica, Italy

[21] Appl. No.: 587,417

[22] Filed: Mar. 8, 1984

[51] Int. Cl.[4] .......................................... H02K 15/09
[52] U.S. Cl. ...................................... 29/597; 29/598; 29/736; 242/7.03; 242/7.05 B
[58] Field of Search ................. 29/597, 598, 732, 736, 29/564.6; 242/7.03, 7.05 R, 7.05 B, 7.05 C

[56] References Cited

U.S. PATENT DOCUMENTS 3,913,220 10/1975 Miller ..................................... 29/597
4,339,872 7/1982 George et al. ........................ 29/597

Primary Examiner—Carl E. Hall
Attorney, Agent, or Firm—Sughrue, Mion, Zinn, Macpeak and Seas

[57] ABSTRACT

A method and a device for forming the rotor winding coils of a dynamoelectric machine and for anchoring the ends of the coils in slots provided in a commutator associated with the rotor. The method comprises the steps of winding a copper wire around pairs of rotor slots to form the various coils of the winding, inserting each coil end in a commutator slot, the starting end of each coil being inserted in the same slot as that in which the end of the previously wound coil is inserted, and bending the portion of copper wire that is adjacent the end of the coil and extends between the rotor and the commutator, towards the rotor shaft immediately before the insertion of each coil end in the corresponding commutator slot. The said step of insertion of each coil end in the corresponding commutator slot and the preceding step of bending the portion of copper wire adjacent the end of the coil towards the rotor shaft, are carried out during the winding of the wire in the rotor slots. During the winding of each coil, and before the said step of inserting the end of the coil in the corresponding commutator slot, the end of the coil is temporarily held by ancillary gripper means which are moved axially from a spaced position to a position closer to the rotor at the moment at which the said bending operation is carried out.

16 Claims, 10 Drawing Figures

னக்கு4,541,170

METHOD AND DEVICE FOR FORMING THE ROTOR WINDING COILS OF A DYNAMOELECTRIC MACHINE

FIELD OF THE INVENTION

The present invention relates to a method of forming the rotor winding coils of a dynamoelectric machine and for anchoring the ends of the coils to a commutator associated with the rotor, the dynamoelectric machine being of the type in which the commutator and rotor each have a cylindrical hollow body and are mounted on the same shaft in positions axially spaced from each other, the rotor has a plurality of axially-extending radial slots for receiving the coils of the windings, and the commutator includes a plurality of radial segments each having a slot in its axially extending outer edge at its end facing the rotor. More particularly, the invention relates to coil-forming and anchoring methods of the type including the steps of:

winding a copper wire around pairs of rotor slots to form the various coils of the winding, inserting each coil end in a slot of the commutator, the starting end of each coil being inserted in the same slot as that in which the terminating end of the previously wound coil is inserted, and bending the portion of copper wire that is adjacent the end of the coil and extends between the rotor and the commutator, towards the shaft of the rotor immediately before the insertion of each coil end in the corresponding commutator slot.

The present invention also relates to devices of known type used in methods of the said type.

BACKGROUND OF THE INVENTION

According to known practice, the step of inserting each coil end in the corresponding commutator slot and the preceding step of bending the portion of copper wire adjacent the end of the coil towards the shaft of the rotor, are effected in the intervals between the winding of successive coils, when the winding device for the copper wire is stopped.

This involves a considerable increase in the time necessary for carrying out the overall process. The time necessary to carry out the said operations of insertion and bending during the intervals between the winding of one coil and the winding of the next coil may in fact reach as much as 50% of the total time required for carrying out the whole process.

Attempts have been made in the past to reduce the duration of the pause required between the winding of two successive coils to effect the bending and insertion operations. These attempts have involved use of commutators of a particular type, for example hook commutators, which have not however solved the problem satisfactorily.

The object of the present invention is to avoid the said disadvantage.

SUMMARY OF THE INVENTION

According to the invention this object is achieved by the fact that the said step of inserting each coil end in the corresponding commutator slot and the preceding step of bending the portion of copper wire adjacent the coil end towards the shaft of the rotor, are effected during winding of the copper wire around the rotor slots, and in that during the winding of each coil, and before the said step of inserting the end of the coil in the corresponding commutator slot, the end of the coil is held by ancillary gripper means which are moved axially from a position spaced from the rotor to a position closer into the rotor at the moment at which the said bending operation is effected. By virtue of this characteristic, the duration of the pause required between the winding of the two successive coils is a minimum since the said bending and insertion operations are carried out during the execution of the winding process. This is possible by virtue of the fact that the end of the coil is held temporarily by the said ancillary gripper means during the formation of the coil. The ancillary gripper means are movable axially between a position spaced from the rotor and a position closer to the rotor in order to avoid risk of breakage of the copper wire during the bending of the wire portion adjacent the end of the coil.

According to a further aspect, the present invention provides a device for forming the rotor winding coils of a dynamoelectric machine and for anchoring the ends of the coils to a commutator associated with the rotor, in which the rotor and the commutator each have a hollow cylindrical body and are mounted on the same shaft in positions axially spaced from each other, in which the rotor has a plurality of axially-extending radial slots intended to receive the coils of the winding, and in which the commutator includes a plurality of radial segments each having a slot in its axially-extending outer edge at its end facing the rotor, the device including:

means for winding a copper wire around pairs of rotor slots to form the various coils of the winding, means for inserting each coil end in a corresponding commutator slot, and means for bending the portion of copper wire that is adjacent the end of the coil and extends between the rotor and the commutator, towards the rotor shift immediately before the insertion of each coil end in the corresponding commutator slot, characterised in that the device further includes ancillary gripper means for holding the end of the coil temporarily during the formation of the coil and before the said operation of insertion of the end of the coil in the corresponding commutator slot, the ancillary gripper means being arranged to move axially from a position spaced from the rotor to a position closer to the rotor at the moment at which the said bending operation is carried out, whereby the operations of bending the copper wire and inserting the coil end in the corresponding commutator slot can be carried out during winding of the copper wire in the rotor slots.

The device according to the invention enables the time required for the overall process to be reduced by as much as 50% for the reasons explained above.

Further characteristics and advantages of the present invention will become apparent from the description which follows with reference to the appended drawings, provided purely by way of nonlimiting example, in which:

DESCRIPTION OF THE PREFERRED EMBODIMENT

Figure 1:
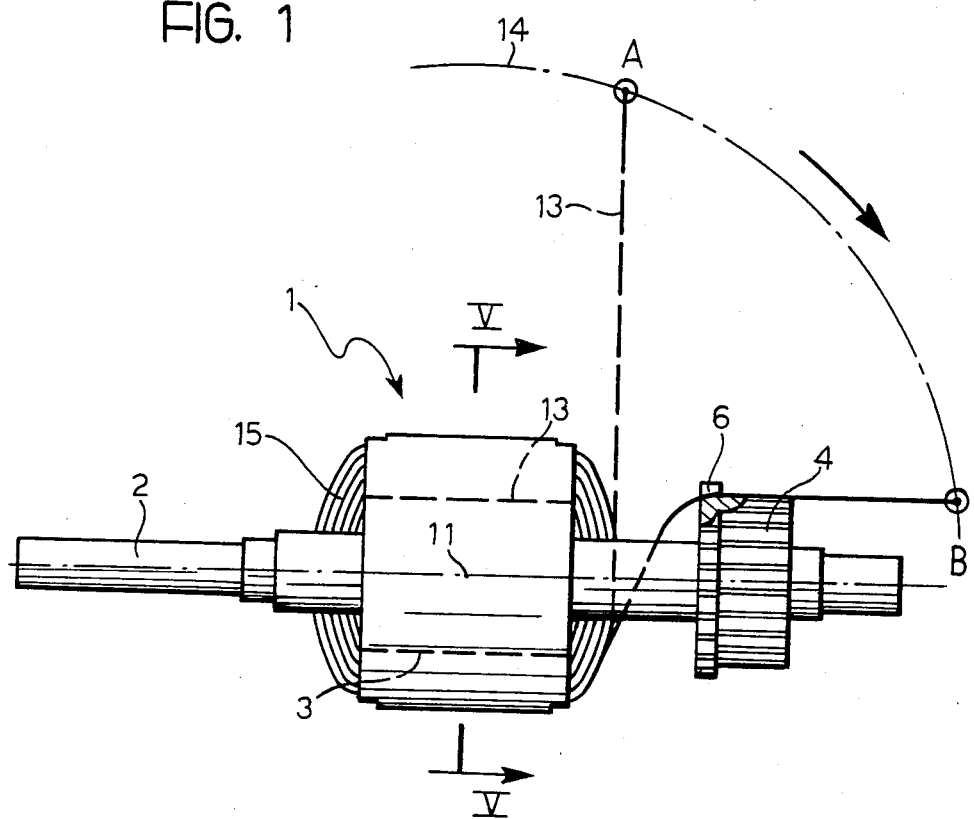
FIGS. 1 to 4 illustrate four successive steps according to a prior art method for forming the rotor winding coils of a dynamoelectric machine and for anchoring the ends of the coils to a commutator associated with the rotor.

In FIGS. 1 to 4, reference numeral 1 indicates the rotor of a dynamoelectric machine, the rotor being mounted on a shaft 2 and having, in known manner a body in the form of a hollow cylinder provided in its outer surface with a plurality of radial slots 3 (see also FIG. 5) that extend axially over the entire length of the rotor and are intended to receive the coils of the winding. The rotor 1 has an associated commutator 4 also of known type, fixed to the shaft 2 in a position axially spaced from the rotor 1. The commutator 4 includes, in known manner, a circumferential series of radial segments 5, for example of hardened copper, that are insulated from each other by means of mica sheets and are so disposed as to constitute a hollow cylindrical body which is fixed to the shaft 2. Each segment 5 has a slot 6 in the end of its axially-extending outer edge that is nearest the rotor 1. The slots 6 of the commutator are intended to receive the ends of the winding coils of the rotor 1.

According to known practice, the formation of the winding coils within the slots of the rotor 1 is achieved by using support means (not illustrated) to secure the shaft 2 carrying the rotor 1 and the commutator 4, in correspondence with a conventional device for winding the copper wire, intended to constitute the coils, within the slots of the rotor.

Figure 5:
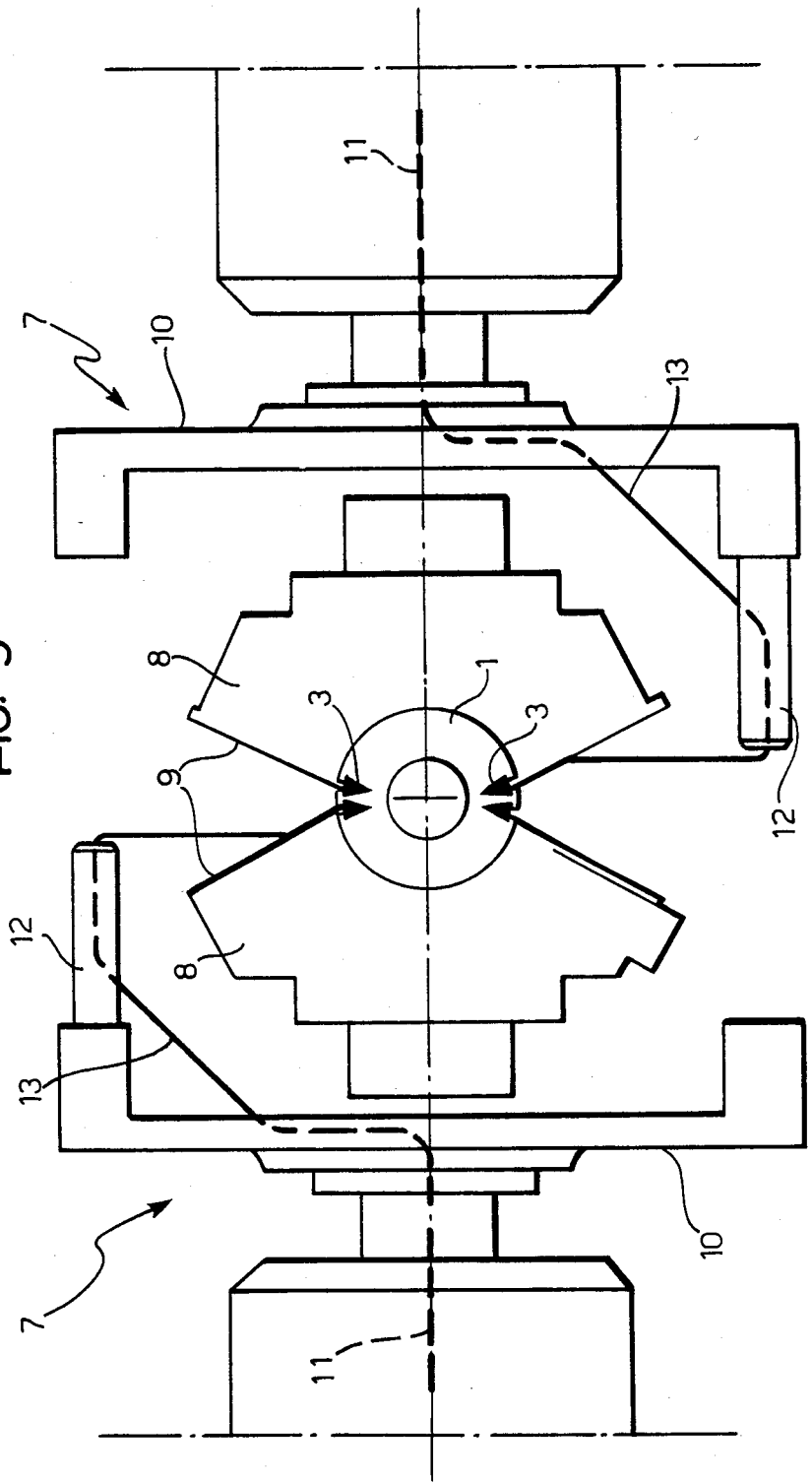
FIG. 5 is a section taken on line V of FIG. 1, FIGS. 6, 7 illustrate two sectional views of two different known forms of commutator.

FIG. 5 illustrates the case in which two winding devices 7 are provided on the two sides of the rotor 1 to allow the simultaneous formation of two coils around two pairs of opposite slots 3 in the rotor. Two fixed structures 8 are also arranged in correspondence with the rotor 1 and have inclined planes 9 for causing the turns of copper wire to slide into the slots 3 as they are wound by the devices 7 on the said surfaces 9. Each winding device 7 is of conventional type including a winding head 10 which rotates about an axis 11 and a winding arm 12 to which the copper wire 13 is fed for winding.

In FIGS. 1 to 4, the circle indicated 14 refers to the path travelled by the axis of the winding arm 12 of one of the two devices 7 in a plane perpendicular to the axis 11.

With reference to FIG. 1, the winding arm 12 rotates in an anticlockwise sense about the axis 11 to allow the formation of a coil 15 within two opposite slots 3 of the rotor.

The terminating end of each coil 15 and the starting end of the subsequently-formed coil are to be inserted in the same slot 6 in the commutator 4.

According to known practice, at the end of the formation of one coil 15, the winding arm 12 is stopped in the position illustrated in FIG. 1, after which it is rotated in a clockwise sense into the position indicated B in order to dispose the portion of copper wire 13 coming away from the coil 15, in a position adjacent the slot 6 in the commutator 4 into which the terminating end of the coil is to be inserted. The known devices provide for the use of an inserter device 16 arranged to move radially relative to the axis of the shaft 2 between a position spaced therefrom and a position close thereto in which it causes the insertion of the terminating end of the coil into the slot 6 in the commutator.

The known devices also include a thrust element 17 movable radially jointly with the inserter tool 16 to deform towards the axis of the shaft 2 the portion of copper wire 13 adjacent the coil terminating end and extending between the rotor 1 and the commutator 4. The thrust element 17 has its working end closer to the axis of the shaft 2 than the inserter tool 16 so as to effect the bending of the wire before the insertion of the end of the coil in the slot 6 of the commutator. Bending of the wire after the insertion of the end of the coil in the slot of the commutator could in fact result in the wire breaking.

Figure 2:
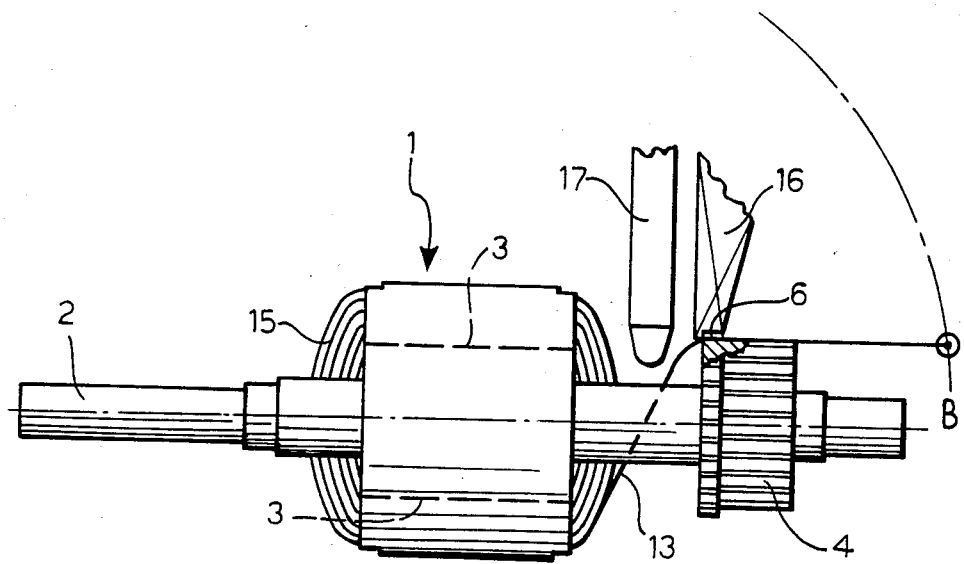

FIG. 2 illustrates the thrust element 17 and the inserter tool 16 in their working position after the formation of a first coil 15 in the rotor slots, the thrust element 17 possibly not appearing to be useful in that it does not contact the copper wire. However it should be borne in mind that after the formation of a certain number of coils, the portions of copper wire which are located between the rotor and the commutator are superposed on each other, producing a certain radial bulk and making the presence of the thrust element 17 useful for radially clamping the bundle of wires located between the rotor and the commutator. The inserter tool 16 is constituted by a blade which obviously has a smaller thickness than the width of the commutator slot so as to be able to insert the ends of the coils within these slots.

Again according to the known art, once the step illustrated in FIG. 2 has been carried out, the insertion and bending assembly constituted by the elements 12, 17 is moved back into its radial position spaced from the shaft 2 and the winding head is rotated in an anticlockwise sense so as to bring the winding arm 12 from the position B to the position A1. At this point (see FIG. 4) the insertion and bending assembly is returned to its working position so as to bring about the insertion of the starting end of the coil next to be wound, in the same slot 6 as that in which the terminating end of the preceding coil 15 has been inserted. Immediately before this, the thrust element 17 bends the portion of copper wire lying between the commutator 4 and the rotor 1 towards the shaft 2. The winding head then rotates in an anticlockwise sense to form the next coil within the slots of the rotor. During the winding of the coil the insertion and bending device 12, 17 is returned to its non-working radial position. When the next coil is to be wound in two slots adjacent those of the preceding coil, before the new winding operation is started the shaft 2 is rotated one step to bring a new pair of slots into position for receiving a coil.

As has already been explained in the preamble to the present description, the prior-art process which has been described briefly above, includes many dead periods and has a total duration which may be twice the time strictly necessary for forming the coils within the rotor slots.

Figure 6:
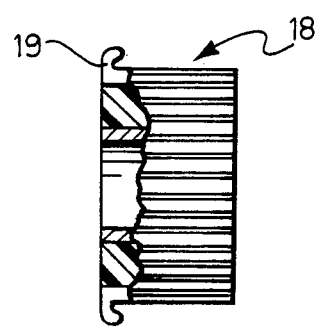
Figure 7:
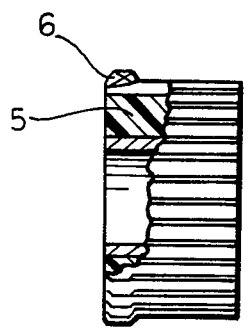

In order to speed up the said working cycle, attempts have been made in the past to use commutators provided with hooks, of the type indicated 18 in FIG. 6. In the case of such commutators, the ends of each coil are connected to the commutator by means of the hooks 19 with which the latter is provided. In this case the movements which must be carried out with the winding head in a stationary condition are the same as those indicated above with reference to FIGS. 1, 3 and 4 and instead of the inserter tool 16, a squashing tool is used which is operated only once, during a step corresponding to that of FIG. 4, in order to squash the hook onto the portion of wire disposed around the hook. The duration of the operations carried out with the winding head stopped is thus reduced relative to the known case described above. However, this second solution has disadvantages due to the greater cost of the hook commutator as compared with conventional types, poor reliability of the contact between the bent hook and the copper wire, and the fact that at high speeds the contact between the copper wire and the hook becomes more labile because of detachment of the hook from the wire as a result of centrifugal forces.

Figure 3:
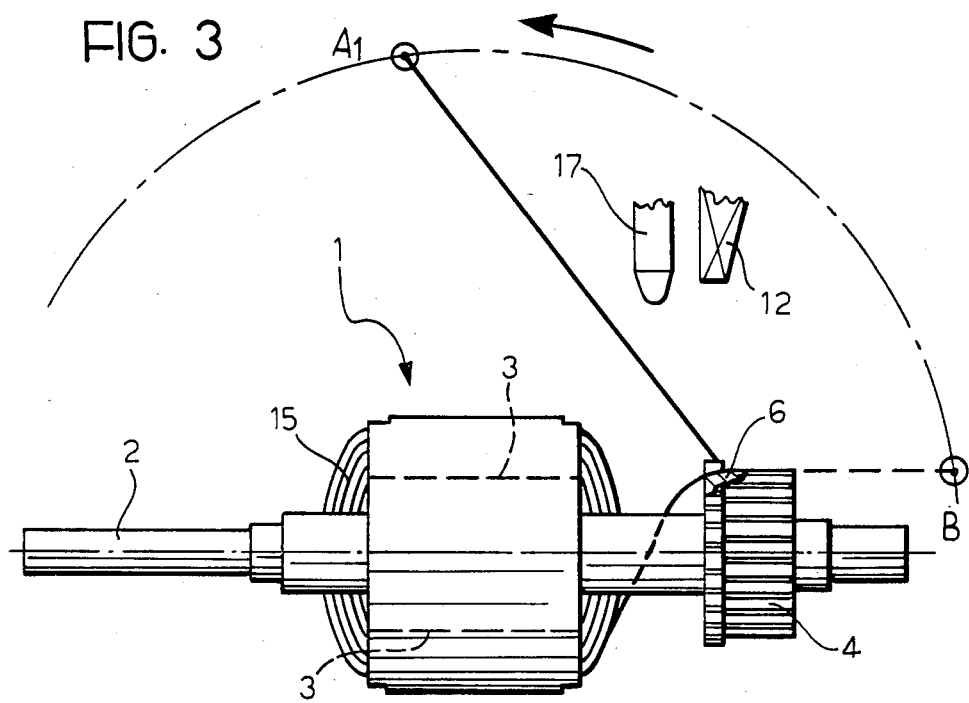
Figure 4:
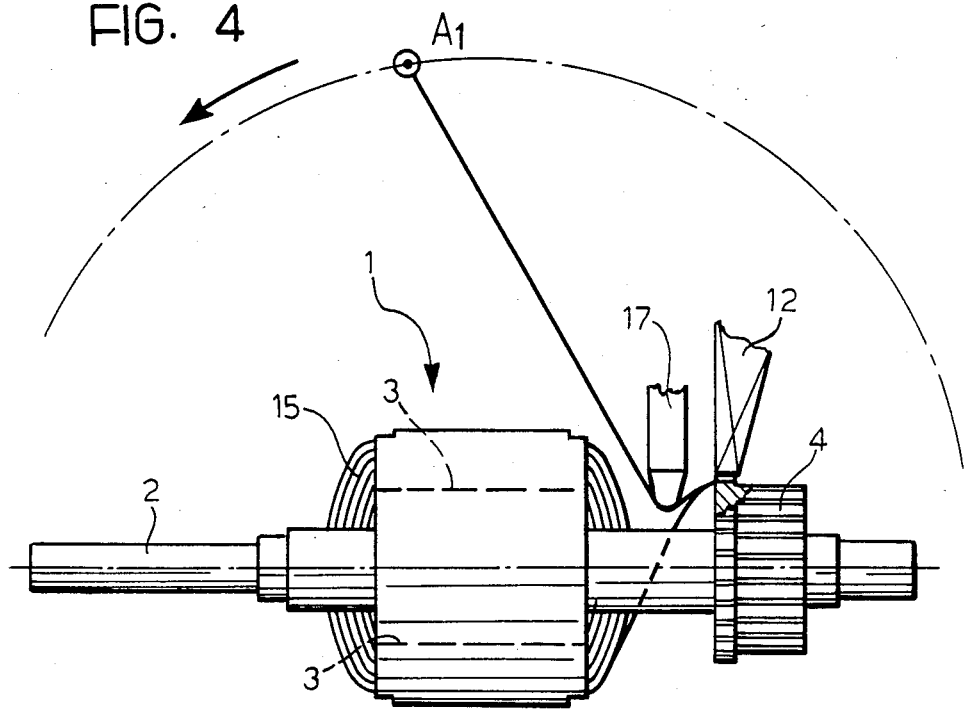

In the device according to the present invention, illustrated in FIGS. 8 to 10, only the operations illustrated with reference to FIGS. 1 and 3 are carried out with the winding head stopped, while the operations described with reference to FIGS. 2 and 4 are achieved during the winding cycle. Consequently there is a considerable reduction in the total cycle time, especially considering the fact that the operations described with reference to FIGS. 2 and 4 are the longest. The time reduction may, other conditions being equal, be as much as 50% of the duration of known processes.

Figure 8:
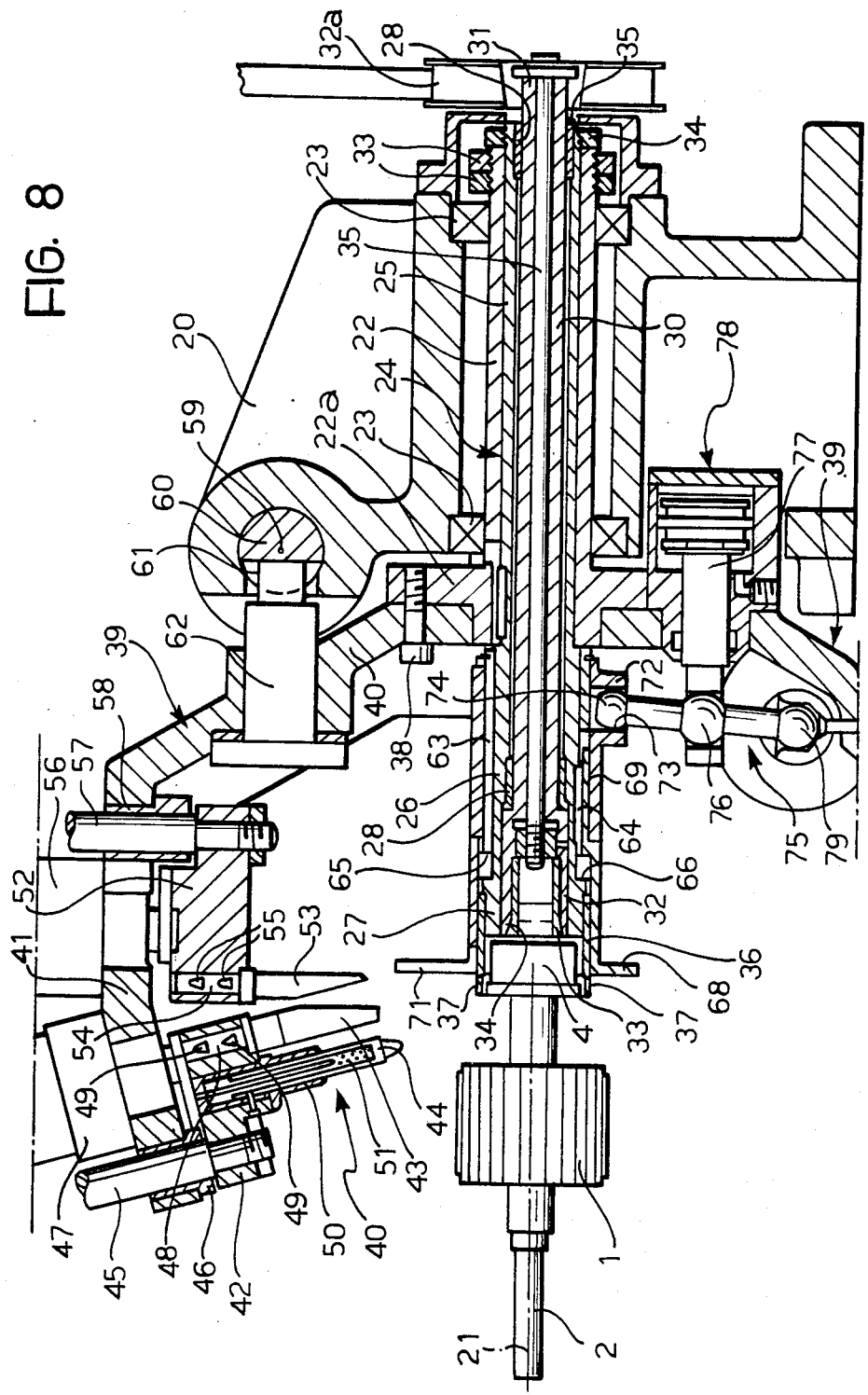
FIG. 8 is a sectional view of a preferred embodiment of the device according to the invention.
Figure 9:
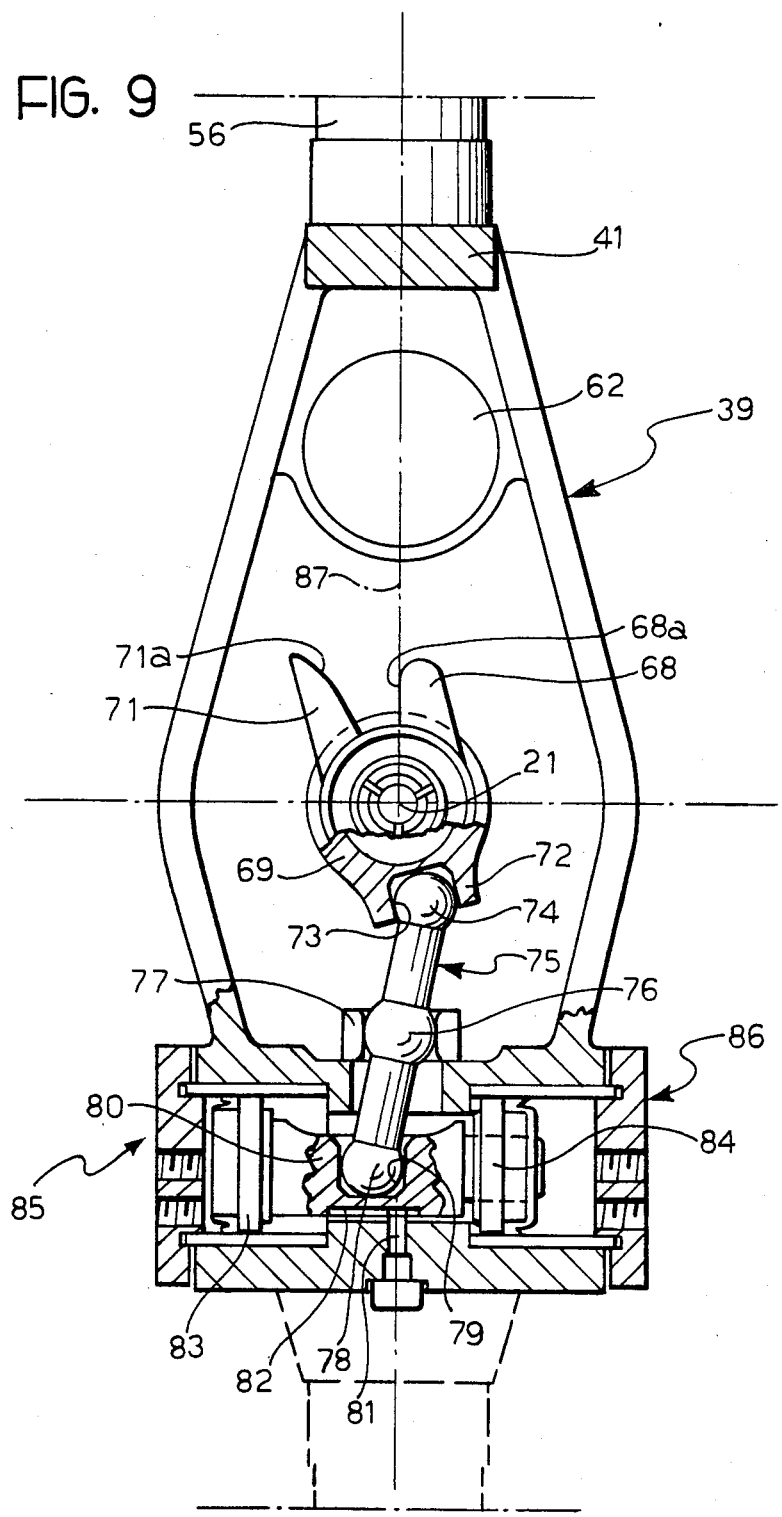
FIG. 9 is a further sectional view of the device of FIG. 8.
Figure 10:
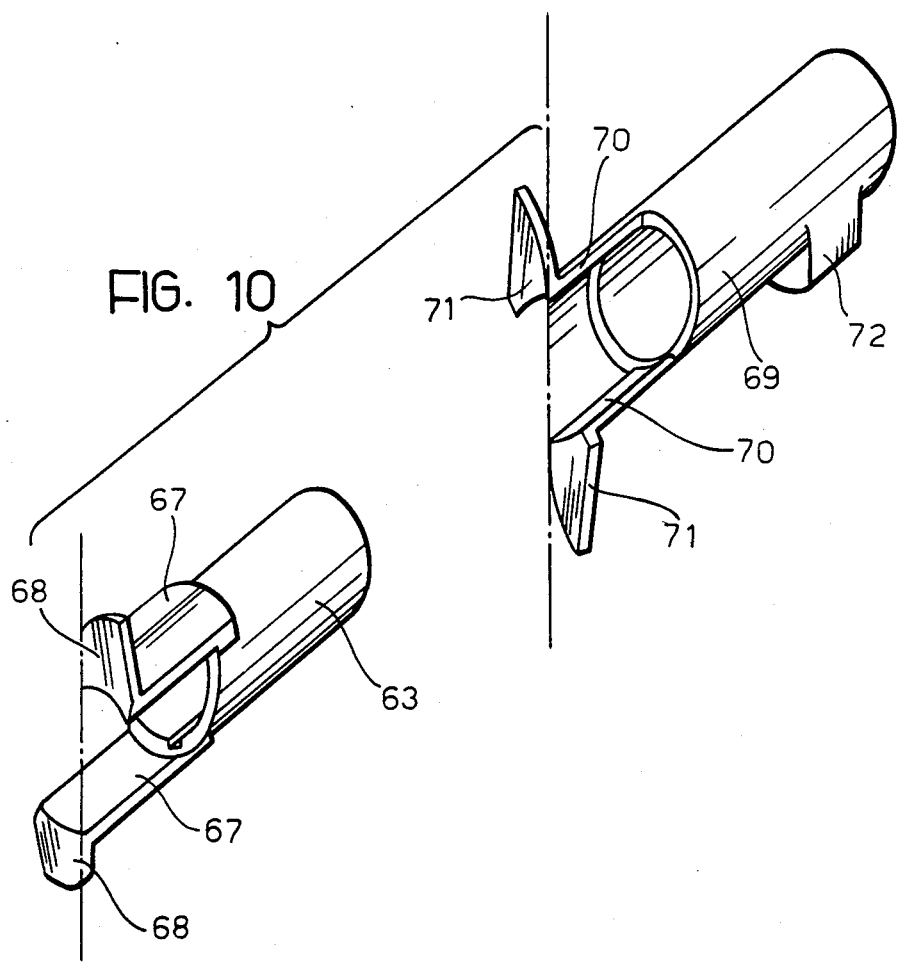
FIG. 10 illustrates a detail of the device of FIG. 8 in perspective.

The preferred embodiment of the device of the invention is illustrated in FIGS. 8 to 10 and includes a fixed structure 20 which is intended to be mounted on the base of a machine and which supports, via two roller bearings 23, a sleeve 22 for rotation about a main axis 21.

A hollow shaft 24 is fixed within the sleeve 22 and has a first end portion 25 located within the sleeve 22, an intermediate portion 26 and a second end portion 27 located outside the sleeve 22. The intermediate portion 26 has a greater diameter than the first end portion 25. The second end portion 27 in its turn has a greater diameter than the intermediate portion 26.

A hollow mandrel 30 is supported for rotation about the main axis 21 within the hollow shaft 25 with the interposition of two bushes 28, the mandrel having one end 31 on which is mounted a pulley 32 arranged to be rotatably driven by means of a conventional drive transmission (not illustrated). The sleeve 22 has a threaded end portion onto which locking rings 33 are screwed to retain the corresponding bearing 23 in position.

A locking ring 34 is screwed onto the end portion of the hollow shaft 24 facing the pulley 32. Finally a resilient ring 35 is mounted on the end 31 of the hollow mandrel 30 to axially locate the mandrel 30.

The part of the hollow mandrel 30 opposite its end 31 is formed with a cup-shaped end 32 in which there is located a gripper 33. This gripper 33 includes radially displaceable gripping sectors which engage a conical surface 34 formed by the internal wall of the cup-shaped end 32 and are connected to a tie rod 35 located within the hollow mandrel 30. The rod 35 is displaceable axially by drive means of known type (not illustrated) to cause the engagement of the sectors 33 with the conical surface 34. The end of the shaft 2 (indicated in broken outline in FIG. 8) which is adjacent the commutator 4 is intended to be held fast by the gripper 33 within the cup-shaped end 32 of the hollow mandrel 30. This latter is thus used as a support structure for the shaft 2 carrying the rotor and the commutator, as well as a means for rotating this shaft about the main axis 21 to allow insertion of the winding coils in the various slots of the rotor.

Fixed to the end 27 of the hollow shaft 24 is a tubular element 36 which projects axially beyond the end 27 so that its free end edge is adjacent the circumferential series of slots in the commutator. The tubular element 36 is formed with notches 37 which are in radial alignment with corresponding ones of the commutator slots and are intended to act as guides for insertion of the ends of the coils in the slots of the commutator.

The sleeve 22 has a flange 22a at its end facing the rotor 1. Two support arms 39 are fixed to the flange by screws 38 and support two insertion and bending assemblies 40, only one of which is illustrated in FIG. 8.

The device illustrated by way of example in the appended drawings includes two insertion and bending assemblies 40 in order to allow the simultaneous winding of two coils in two pairs of rotor slots. Clearly, however, the device according to the invention may alternatively be provided with a single support arm 39 carrying a single bending and insertion assembly.

Each support arm 39 includes a first portion 40 extending radially outwardly from the flange 22a and a second portion 41 extending substantially axially and carrying the insertion and bending assembly at its end. This assembly comprises a support 42 which is slidably mounted relative to the portion 41 of the arm 39 for movement in a direction substantially radially of the main axis 21, between a spaced position (illustrated in FIG. 8) and a close in position in which an inserter tool 43 and a wire-bending thrust element 44 are in their operative positions. The support 42 is provided with a cylindrical guide rod 45 which is slidably mounted, with the interposition of a bush 46, in the end of the portion 41 of the support arm 39.

The movement of the assembly 40 between its said position spaced from the main axis 21 and the said position close in to the axis, is effected by means of an actuator 47 which is carried by the support arm 39 and has its rod connected to the support 42.

The inserter tool 43, in the form of a blade, is intended to be inserted in the notches 37 of the tubular element 36 and in the commutator slots in order to cause the insertion of the ends of the winding coils into the commutator slots. The inserter tool 43 has a tang 48 which is fixed within a corresponding hole in the support 42 by screws (not illustrated) the ends of which act on flat portions 49 of the surface of the tang 48.

The wire-bending thrust element 44 has a cylindrical body with a working end shaped like a nose, and is slidable in a bush 50 fixed to the support 42. A helical spring 51 interposed between the element 44 and the bush 50 urges the element 44 into an extended position.

The arm 39 also acts as a support for a wire cutting unit including a support 52 carrying a wire cutting blade 53. This latter, in a similar manner to the inserter blade 43 has a tang 54 with flat surface portions 55 for engagement by the ends of locking screws (not illustrated) arranged to secure the tang 54 in a seat in the support 52. This support is also mounted for sliding movement relative to the arm 39, in a direction radially of the axis 21, between a position spaced from the main axis 21 (illustrated in FIG. 8) and a position close in to this axis in which the blade 53 is in its operative condition. The radial movement of the unit 52 is effected by means of an actuator 56 and is guided by a guide rod 57 which is fixed at one end to the support 52 and is slidably mounted, with the interposition of a bush 58, in the structure of the arm 39.

The arm 39 and the units 40 and 52 carried thereby can be bodily rotated about the main axis 21 by virtue of the fact that the arm 39 is fixed to the sleeve 22 which in its turn is rotatably supported about the axis 21 of the fixed structure 20 by means of the bearings 23.

Mounted on the fixed structure 20 is an actuator the axis 59 of which is tangential to the axis 21 and lies in a plane perpendicular to the axis 21. FIG. 8 illustrates only the shaft 60 of this actuator, the shaft being provided with a lateral groove 61 in which one end of an axial pin 62 carried by the support arm 39 is engaged. The shaft 60 of this actuator is arranged to cause, via the pin 62, pivoting movement of the support arm 39 about the main axis 21 between two different angular positions spaced from each other by an angle which can be adjusted by means known per se (not illustrated), the angle being substantially equal to the angle between two adjacent commutator slots.

A bush 63 is mounted on the intermediate portion 26 of the hollow shaft 25 with the interposition of a splined coupling 64 so that the bush 63 is fast for rotation with the shaft 24 but is movable axially relative thereto between a position spaced from the commutator 4 (illustrated in FIG. 8) and an advanced position in which one of its end surfaces 65 (see also FIG. 10) is in contact with an annular shoulder 66 defined by the larger diameter portion 27 of the hollow shaft 24.

As illustrated clearly in FIG. 10, the bush 63 has two axial projections 67 on its end facing the commutator 4, the projections having two radial fins 68 at their free ends serving as gripping elements for the copper wire as will be clarified below.

A second bush 69 is rotatably mounted on the bush 63 and is movable axially with the bush 63 between the two limit positions defined above. The bush 69 has two diametrically-opposed axial projections 70 on its end facing the commutator 4, the projections 70 being formed at their free ends with two radial fins 71 which are arranged to cooperate with the radial fins 68 to grasp the ends of two coils wound simultaneously in the slots of the rotor 1. The two bushes 63, 69 are provided with two pairs of radial fins 68, 71 since the embodiment of the device described above provides for the simultaneous winding of two coils in the rotor slots. Obviously, however, it would suffice to provide a single pair of radial gripping fins for the wire in cases where the device provides for the winding of only one coil at a time in one pair of rotor slots.

As is also visible in FIG. 9, the bush 69 has an external lug 72 formed with a radial hole 73 which receives one end 74 of a lever 75. The lever 75 is articulated in an intermediate zone 76 to a shaft 77 of an actuator 78 arranged parallel to the main axis 21. The end 79 of the lever 75 opposite the end 74 is articulated in a seat 79 of a control member 80 which is movable, in a direction perpendicular to the plane containing the main axis 21 nd the axis of the cylinder 78, between two limit positions defined by the engagement of a pin 81 against the ends of a groove 82 formed in the control member 80. This latter is connected at its ends to the pistons 83, 84 of two actuators 85, 86 which control the position of the control member 80.

The actuator 78 serves to effect the simultaneous axial displacement of the bushes 63, 69 and consequently of the two pairs of gripping fins 68, 71, between the position spaced from the commutator illustrated in FIG. 8 and the advanced position corresponding to stoppage against the annular shoulder 66 of the shaft 24.

In this advanced position the two pairs of fins 68, 71 are axially positioned in correspondence with the circumferential series of slots in the commutator 4.

The bush 63 is in a fixed angular position relative to the shaft 24 while the bush 69 may be rotated relative to the bush 63 by means of the lever 75 and the two actuators 85, 86. The bush 69 can be rotated between a first position, illustrated in FIG. 9, in which the facing edges 68a and 71a of each pair of gripping fins 68, 71 are spaced from each other by an angle for example substantially equal to 30° (the edges 68a and 71a being contained in radial planes passing through the main axis 21), and a second position in which the edges 68a, 71a are substantially in contact with each other and lie in a plane substantially coincident with the median plane 87 (see FIG. 9) of the device.

The operation of the device described above is as follows.

At the beginning of a cycle, before the placement of the shaft 2 carrying the rotor 1 and the commutator 4 on the machine, the gripper 33 is in an open position and the pivotable assembly constituted by the two support arms 39, and the respective assemblies supported thereby, are in the central position illustrated in FIG. 9. The bushes 63, 69 are in their axially withdrawn position illustrated in FIG. 8, and the rotatable bush 69 is in its angular position corresponding to the closure of the two pairs of fins 68, 71. For each of the two coils intended to be wound simultaneously on the rotor, the end of the wire to be used is held by a corresponding pair of the gripping fins 68, 71. Under these conditions, the shaft 2 can be mounted on the machine and held by means of the gripper 33, the shaft being located in an angular position such that one of the slots 6 of the commutator 4 is located in correspondence with the edge 68a of the fin 68. It is possible to provide means of known type (not illustrated) for automatically finding the correct angular position for the commutator.

The winding arms 12 (see FIG. 5) are thereafter rotated to wind two coils simultaneously within two pairs of slots 3 in the rotor. Once the first turn of each coil has been wound and during subsequent winding, the following operations are effected successively: the cylinder 78 causes the simultaneous axial movement of the two bushes 63, 69 towards the position closed up towards the commutator 4 corresponding to the engagement of the end 65 of the bush 63 against the annular shoulder 66 so as to slacken the starting portion of wire of the winding; the actuator 47 is then actuated to bring the bending and insertion assembly into its working position. In this working position, the wire-bending thrust element 44 causes the bending of the portion of wire between the end gripped between the fins 68, 71 and the coil being wound on the rotor, pushing this portion towards the shaft 2, into the zone between the rotor 1 and the commutator 4. This bending is effected without the risk of breaking the wire by virtue of the fact that this portion of wire has previously been slackened. Immediately after this bending operation, the inserter blade 43, the operative end of which is slightly set back relative to the operative end of the wire-bending element 44, is inserted between the fins 68, 71 (the edges 68a, 71a of which have flared leading portions at their radially outer ends) into the corresponding notch 37 of the tubular element 36 and the slot 6 of the commutator thereby causing the insertion of the copper wire into this slot. Once this operation has been effected, and while the winding of the coil on the rotor is still continuing, the actuator 47 returns the assembly 40 to the position illustrated in FIG. 8. Any unwanted wire is cut off by means of the actuator 56 and the wire cutting blade 53, and the fins 68, 71 are returned, if desired, into their opened state illustrated in FIG. 9 and into their axial withdrawn position illustrated in FIG. 8. The actuator 56 returns the wire cutting blade 53 to the position illustrated in FIG. 8.

The pivotable unit constituted by the two support arms 39 is then rotated about the main axis 21 through an angle corresponding to the angle between two adjacent slots in the commutator, by means of the rod 60 of the corresponding actuator, whereby to bring the edge 68a of the fin 68 into the radial plane corresponding to the commutator slot adjacent that into which the starting end of the coil was inserted. The terminating end of each coil must in fact be inserted into the same commutator slot as that in which the starting end of the next coil is inserted. Obviously the terminating end of the last coil is inserted into the slot in which the starting end of the first coil has been inserted.

At the end of the formation of the first coil, when the winding arm begins its slowing down revolution, each fin 71 must be brought into its open position illustrated in FIG. 9 if this has not already been done. The winding arm is stopped in position A of FIG. 1 and is then rotated in the opposite sense to bring it into the position B which is angularly displaced by 90° relative to position A. In this manner, the portion of wire between the winding arm and the coil already wound on the rotor, is inserted between the fins 68, 71. The fin 71 is rotated to bring it into its closed position so as to cause the pinching of the wire between the two fins 68, 71. At this point the process differs from known processes in that the winding arm 12 proceeds immediately to wind the second coil without waiting for the insertion of the terminating portion of the first coil in the corresponding commutator slot. Once the first turn of the second coil has been wound, and while winding of the second coil continues the following operations are carried out: the two bushes 63, 69 are brought into their axial position closed up towards the commutator 4 so as to slacken the initial portion of wire extending between the end gripped by the fins 68, 71 and the turns being wound on the rotor; the assembly 40 is advanced by means of the actuator 47 to bend the slackened portion of wire towards the shaft 2 and insert the wire in the corresponding commutator slot in the manner which has been described above; the assembly 40 is then returned to its non-working position and the fins 68, 71 are returned to their open withdrawn condition.

At the end of the formation of the second coil, the same operations described above that are carried out at the end of the formation of the first coil, are carried out with the addition of a rotation of the hollow mandrel 30 through an angle equal to the angle between two adjacent slots 3 in the rotor. This rotation which must be carried out each time two coils have been formed, is effected by means of a stepping motor (not illustrated) driving the hollow mandrel 30.

After the final coil has been wound, an identical cycle of operations is carried out with the addition of the following operations: the fins 68, 71 are closed to pinch the wire; the actuator 56 operates the wire cutting blade 53.

In the device according to the invention, the use of the fins 68, 71 constituting ancillary gripper means which hold the end of the coil wire during winding of the first coil and insertion of the wire end into the corresponding commutator slot, allow the bending and insertion operations to be carried out during the execution of the winding process and also allow squeezing of the wire itself to be effected to give the latter a predetermined width whatever the initial diameter of the wire. This allows the use of a single type of commutator with different diameter wires which is not possible with devices according to the known art.

Naturally, the principle of the invention remaining the same, the constructional details and the embodiments may be varied widely with respect to that described and illustrated, without thereby departing from the scope of the present invention.

I claim:

1. A method of forming the winding coils of a rotor of a dynamoelectric machine and for anchoring the ends of the coils to a commutator associated with the rotor, said dynamoelectric machine being of the type in which the said commutator and rotor each have a hollow cylindrical body and are mounted on a common shaft in positions axially spaced from each other, in which the rotor has a plurality of axially-extending radial slots for receiving the said winding coils, and in which the commutator includes a plurality of radial segments each having a slot at its end facing the rotor; said method including the steps of:

winding a copper wire in pairs of said slots in the rotor to form the said winding coils, inserting each coil end in a said slot of the commutator, the starting end of each coil being inserted in the same slot as that in which the terminating end of the previously wound coil is inserted, and bending the portion of copper wire that lies adjacent the end of each said coil and extends between the rotor and the commutator, towards the said shaft of the rotor immediately before the insertion of the associated coil end in the corresponding slot of the commutator, wherein the improvement comprises:

effecting the said step of inserting each coil end in the corresponding commutator slot and the preceding step of bending the said portion of copper wire adjacent the coil end towards the rotor shaft, during the step of winding said wire in said commutator slots, and holding the end of each said coil during the winding of the coil and before the said step of inserting the end of the coil in the corresponding commutator slot, the held coil end being moved axially from a position spaced from said rotor to a position closer to the rotor at the moment at which the said bending operation is effected.

2. A device for forming the winding coils of a rotor of a dynamoelectric machine and for anchoring the ends of said coils to a commutator associated with the rotor, said dynamoelectric machine being of the type in which the said rotor and commutator each have a hollow cylindrical body and are mounted on a common shaft in positions axially spaced from each other, in which the rotor is formed with a plurality of axially-extending radial slots intended to receive the said coils, and in which the commutator includes a plurality of radial segments each formed with a slot in its axially-extending outer edge at its end facing the rotor; the device including:

a support structure arrangement, winding means for winding a copper wire within pairs of said rotor slots to form the various said winding coils, insertion means for inserting each coil end in a corresponding said slot in the commutator, and bending means for bending the portion of said wire that is adjacent the said coil end and extends between said rotor and commutator towards the shaft of the rotor immediately before the insertion of each coil end in the corresponding commutator slot, the said winding means, insertion means and bending means being mounted on said support structure arrangement, wherein the improvement comprises providing the said device with:

gripper means carried by said support structure arrangement and arranged to hold the said coil end temporarily during the formation of the coil and before the operation of said insertion means, displacing means for displacing said gripper means in the axial direction of said rotor shaft from a position spaced from the rotor to a position closer to the rotor at the moment at which the said bending operation is carried out, whereby the bending and inserting of the coil end in the corresponding commutator slot can be carried out during winding of said wire in the rotor slots.

3. A device according to claim 2, wherein said support structure arrangement includes:

a fixed structure, a first support structure for supporting, for rotation about a main axis, the said common shaft carrying the rotor and commutator, a second support structure for supporting said bending means and insertion means, the said second support structure being mounted on the fixed structure for pivoting movement about said main axis, means for pivoting said second support structure between two different angular positions spaced from each other by an angle substantially equal to the angle between two adjacent said slots of the commutator, and a support member connected to said second support structure and arranged to support said gripper means, the said gripper means including at least one pair of gripper elements located adjacent the commutator, one gripper element of each said pair being rotatable relative to the other gripper element about the said main axis whereby these gripper elements are movable between a closed position for gripping a said coil end and a mutually-spaced position, the gripper elements also being jointly movable in an axial direction between the said spaced position and the said closer position relative to the rotor, means being provided for varying the angular position of said shaft carrying the rotor and the commutator.

4. A device according to claim 3, wherein the said second support structure includes:

a sleeve mounted on the said fixed structure for rotation about the said main axis and having a support flange on its end facing the rotor, and at least one support arm having a first portion fixed to said support flange and extending radially outwardly from the flange, and a second portion which extends axially towards the rotor, the said bending means and insertion means respectively including a wire-bending element and an insertion blade jointly radially movable relative to the second portion of said support arm between a non-working position spaced from the commutator and an operative close-in position.

5. A device according to claim 4, wherein the said fixed structure has an actuator for pivoting the said second support structure.

6. A device according to claim 4, wherein the said support arm has an actuator for effecting the radial movement of the bending and insertion means.

7. A device according to claim 4, wherein the said support arm has a wire-cutting device and an actuator for effecting movement of the cutting device between an inoperative position and an operative position.

8. A device according to claim 5, wherein the said support arm has an axial pin connected to an operating rod of said actuator.

9. A device according to claim 6, wherein the said bending and insertion means include a common body having a cylindrical guide rod slidably mounted in said support arm.

10. A device according to claim 7, wherein the said wire cutting device includes a support which is controlled by the said actuator, the support being provided with a cylindrical guide rod which is slidably mounted in said support arm.

11. A device according to claim 3, wherein the device further includes:

a hollow shaft having a first end portion fixed within the said sleeve, an intermediate portion which is of greater diameter than the said first end portion and projects axially beyond said sleeve, and a second end portion of greater diameter than the said intermediate portion, a first bush mounted on said intermediate portion, the first bush being fast for rotation with said intermediate portion but movable axially relative to the latter between a spaced position and a closer-in position relative to the commutator, and a second bush rotatably mounted on the said first bush and movable axially therewith, said first and second bushes each having a pair of diametrically-opposed axial projections at their ends facing the commutator, the projections being provided at their free ends with radial fins constituting the said gripper elements, the gripper means further including means for effecting rotation of said second bush relative to said first bush about the said main axis, and the said displacement means being constituted by means for effecting axial movement of the two bushes relative to said intermediate portion of the said hollow shaft.

12. A device according to claim 11, wherein the means for effecting axial movement of the two bushes and the means for effecting rotation of the second bush jointly include a plurality of actuators acting on a single control lever connected to the second bush.

13. A device according to claim 12, wherein the said first support structure is constituted by a hollow mandrel rotatably mounted within the said hollow shaft and having a cup-shaped end provided with a gripper device for gripping one end of the said shaft carrying the rotor and the commutator.

14. A device according to claim 13, wherein the said gripper device includes a tie rod located within the hollow mandrel and by means of which the gripper is operable.

15. A device according to claim 14, wherein the said hollow mandrel is provided at its end opposite said cup-shaped end with a pulley connected to a drive transmission.

16. A device according to claim 2, wherein the said gripper means are arranged to apply a pressure to the portion of wire gripped thereby such as to squeeze the wire itself so as to cause it to conform to a predetermined width corresponding substantially to the width of the said corresponding commutator slot whereby it is possible to use the same type of commutator whatever the diameter of the wire.

* * * * *